United States Patent [19]
Seckinger

[11] 3,835,133
[45] Sept. 10, 1974

[54] HEXAHYDRO-1,3,5-TRIAZINE-2,4-DIONES
[75] Inventor: Karl Seckinger, Riegal/Baden, Germany
[73] Assignee: Sandoz Ltd., Basle, Switzerland
[22] Filed: Mar. 15, 1971
[21] Appl. No.: 341,405

Related U.S. Application Data
[63] Continuation-in-part of Ser. No. 207,597, Dec. 13, 1971, abandoned.

[52] U.S. Cl. ................................ 260/248 NS, 71/93
[51] Int. Cl. .................................................. C07d 55/18
[58] Field of Search .............................. 260/248 NS

[56] References Cited
UNITED STATES PATENTS
3,525,789   8/1970   Chupp ............................. 260/248

OTHER PUBLICATIONS
Schafer, J. Amer. Chem. Soc., Vol. 73, pp. 2996–2999 (1951) QD1.A5
Richter, Chem. Berichte, Vol. 101, pp. 3002–3009 (1968) QD1.D4
Ulrich et al., J. Org. Chem., Vol. 33, pp. 3928–3930 (1968) QD241,J6
Dyer et al., J. Org. Chem., Vol. 33, pp. 3931–3932 (1968) QD241J6

Primary Examiner—John M. Ford
Attorney, Agent, or Firm—Gerald D. Sharkin; Richard E. Vila

[57] ABSTRACT

The present invention concerns novel hexahydro-1,3,5-triazine-2,4-diones of the general formula:

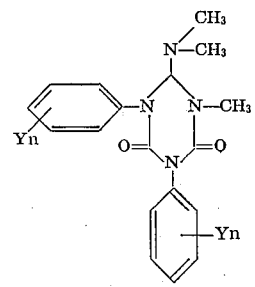

I wherein each Y is alkyl, trifluoroalkyl, fluorine, chlorine, bromine, alkoxy, aryloxy or nitro and $n$ is o, 1, 2 or 3.

The compounds exhibit a herbicidal effect.

11 Claims, No Drawings

HEXAHYDRO-1,3,5-TRIAZINE-2,4-DIONES

This application is a continuation-in-part of our co-pending application Ser. No. 207,597, filed Dec. 13, 1971, now abandoned.

The present invention relates to 1,3,5-triazine-2,4-diones derivatives.

The present invention provides hexahydro-1,3,5-triazine-2,4-dione of general formula I,

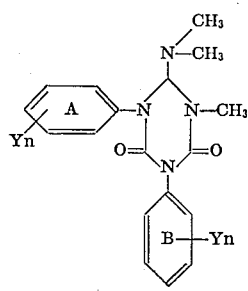

I wherein the rings A and B are the same, Y being alkyl of one to five carbon atoms, trifluoroalkyl of one to five carbon atoms, fluorine, chlorine, bromine, alkoxy of one to five carbon atoms, aryloxy or nitro and $n$ is 0, 1, 2 or 3.

By aryloxy is meant phenoxy or phenoxy substituted by chlorine.

When Y is alkyl, trifluoroalkyl or alkoxy, these may be straight or branched chain.

The present invention also provides a process for the production of compound of formula I, which comprises reacting a compound of formula II, $$(CH_3)_2N-CH=N-CH_3$$

II with at least two equivalents of a compound of formula III,

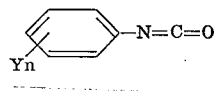

III wherein Y and $n$ are as defined above.

The production of the compound of formula I may be effected as follows:

To the compound of formula II there is added, in the presence of an appropriate solvent, e.g. a hydrocarbon such as petroleum ether or cyclohexane, or an ether such as diethyl ether, if required, in the presence of a catalyst such as for example a tertiary amine, preferably with cooling to 0° and in the absence of moisture, two equivalents of a compound of formula III in one of the above mentioned solvents. After reaction, working up is effected in conventional manner.

The compounds of formula I of the invention are generally crystalline substances. The IR and NMR spectral data of the compounds of formula I of the invention correspond to the indicated structures.

The compounds of formulae II and III required as starting materials for the synthesis of the compounds of formula I may be obtained according to processes described in the literature (see Chem. Ber. 98, 1078 [1965]).

The compound of formula I are useful as herbicides particularly selective herbicides in cultivated plants as indicated by their herbicidal effect on the growth of the weeds *Amaranthus retroflexus, Capsella bursa pastoris, Chenopodium album, Galium aparine, Stellaria media, Senecio vulgaris and Echinochloa crus* galli and lack of significant herbicidal effect on the cultivated plants wheat, carrots and cotton, as determined by pre- and post-emergence application of compounds of formula I on the abovementioned weeds and cultivated plants in an amount of 4 kg/hectare thereof.

For the abovementioned use, the amount applied to a locus to be treated will of course vary depending on the compound employed, the mode of application, ambient conditions and the weed species to be combated.

However, an indicated amount to be applied to a locus is between 1 and 10 kg/hectare, as a single amount or in divided amounts.

The compounds may be applied to the locus with conventional applicator equipment and by conventional methos e.g. strewing, spraying and dusting.

Compositions may comprise a compound of formula I in admixture with herbicidal carriers, diluents and/or herbicidal adjuvants.

Concentrate forms of the compositions may generally contain between 2 and 80 percent, preferably between 2 and 50 percent by weight of a compound of formula I.

Application forms of the compositions may generally contain between 0.01 and 10 percent by weight of a compound of formula I.

Preferred compounds of formula I are 6-dimethylamino-1,3-di-(3,4-dichlorophenyl)5-methyl-hexahydro-s-triazine-2,4-dione and 6-dimethylamino-1,3-di-(3-chlorophenyl)-5-methyl-hexa-hydro-s-triazine-2,4-dione.

The following Examples serve as illustration only, of the production of the compound of formula I without in any way limiting the scope of the present invention. Temperatures referred to are in °C.

EXAMPLE 1

6-Dimethylamino-1,3-di-(3,4-dichlorophenyl)-5-methyl-hexahydro-s-triazine-2,4-dione 86 g (1mol) of N,N,N'-trimethylformamide in 200 cc of petroleum ether are cooled to about 0° in a vessel protected against atmospheric humidity and the solution of 376 g (2 mols) of 3,4-dichlorophenyl isocyanate in 800 cc of ether is added with stirring; the temperature is kept at 0°. The vessel protected against atmospheric humidity is kept at room temperature for about 3 days. The solvent mixture is decanted and the reaction product is taken up in ether. The ether is distilled off; the resulting viscous oil which is dried in a high vacuum crystallizes after a short period. M.P. 141°–142°. The reaction time shortens to about 3 hours when the reaction is effected only in ligroine (boiling range 60°–90°).

| Analysis: | $C_{18}H_{16}Cl_4N_4O_2$ | | Molecular weight: 462.16 | |
|---|---|---|---|---|
| Calc. | C 46.8 % | H 3.5 % | N 12.1 % | Cl 30.7 % |
| Found | 46.9 % | 4.1 % | 11.6 % | 30.3 % |

The compounds of formula I indicated in the following Table, are obtained by a process analogous to that described in Example 1.

| Example | Y | n | Empirical formula | Molecular weight | M.P. | Analysis % Calc. Found | | | | |
|---|---|---|---|---|---|---|---|---|---|---|
| | | | | | | C | H | N | F | Cl | Br |
| 2 | | 0 | $C_{16}H_{20}N_4O_2$ | 324.3 | 175° | 66.6 | 6.2 | 17.2 | — | — | — |
| | | | | | | 66.2 | 6.4 | 16.9 | — | | |
| 3 | m-CF$_3$ | 1 | $C_{20}H_{18}F_6N_4O_2$ | 460.4 | 124–25° | 52.2 | 3.9 | 12.2 | 24.8 | — | — |
| | | | | | | 52.2 | 4.2 | 12.5 | 24.4 | — | — |
| 4 | m-Cl p-OCH$_3$ | 2 | $C_{20}H_{22}Cl_2N_4O_2$ | 453.3 | 110° | 53.0 | 4.9 | 12.4 | — | 15.6 | — |
| | | | | | | 52.9 | 4.9 | 12.0 | — | 15.0 | — |
| 5 | p-Cl | 1 | $C_{18}H_{18}Cl_2N_4O_2$ | 393.3 | 106–109 | 55.0 | 4.6 | 14.2 | — | 18.0 | — |
| | | | | | | 55.0 | 4.9 | 13.7 | — | 18.0 | — |
| 6 | p-F | 1 | $C_{18}H_{18}F_2N_4O_2$ | 360.4 | 149–51° | 60.9 | 5.0 | 15.5 | 10.5 | — | — |
| | | | | | | 60.1 | 5.3 | 15.0 | 10.3 | — | — |
| 7 | p-Br | 1 | $C_{18}H_{18}Br_2N_4O_2$ | 482.2 | 155–56° | 44.9 | 3.8 | 11.6 | — | — | 33.2 |
| | | | | | | 45.4 | 4.0 | 11.5 | — | — | 33.5 |
| 8 | m-Cl | 1 | $C_{18}H_{18}Cl_2N_4O_2$ | 393.3 | 144–45° | 55.0 | 4.6 | 14.2 | — | 18.0 | — |
| | | | | | | 54.9 | 4.7 | 14.2 | — | 18.2 | — |

| Example | Y | n | Empirical formula | Molecular weight | M.P. | Analysis, percent, calc./found | | | | | |
|---|---|---|---|---|---|---|---|---|---|---|---|
| | | | | | | C | H | N | F | Cl | Br |
| 9 | p-⟨phenyl⟩-O— | 1 | $C_{30}H_{28}N_4O_4$ | 508.4 | | | | | | | |
| 10 | p Cl-⟨phenyl⟩-O— | 1 | $C_{30}H_{26}Cl_2N_4O_4$ | 577.4 | | | | | | | |
| 11 | p NO$_2$— | 1 | $C_{18}H_{18}N_6O_6$ | 414.3 | | | | | | | |

What is claimed is:

1. A compound of the formula:

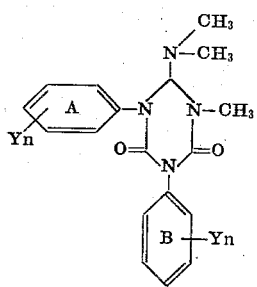

wherein the rings A and B are the same, Y being alkyl of one to five carbon atoms, trifluoroalkyl of one to five carbon atoms, fluorine, chlorine, bromine, alkoxy of one to five carbon atoms, phenoxy, chlorophenoxy or nitro and $n$ is 0, 1, 2 or 3.

2. A compound of claim 1, wherein Y is alkyl of one to five carbon atoms, trifluoroalkyl of one to five carbon atoms, fluorine, chlorine, bromine or alkoxy of one to five carbon atoms.

3. A compound of claim 2, wherein Y is methyl, trifluoromethyl, fluorine, chlorine, bromine or methoxy.

4. The compound of claim 3, which is 6-dimethylamino-1,3-di-(3,4-dichlorophenyl)-5-methyl-hexahydro-s-triazine-2,4-dione.

5. The compound of claim 3, which is 5-dimethylamino-1,3-diphenyl-5-methyl-hexahydro-s-triazine-2,4-dione.

6. The compound of claim 3, which is 6-dimethylamino-1,3-di-(3-trifluoromethylphenyl)-5-methyl-hexahydro-s-triazine-2,4-dione.

7. The compound of claim 3, which is 6-dimethylamino-1,3-di-(3-chloro-4-methoxyphenyl)-5-methyl-hexahydro-s-triazine-2,4-dione.

8. The compound of claim 3, which is 6-dimethylamino-1,3-di-(4-chlorophenyl)-5-methyl-hexahydro-s-triazine-2,4-dione.

9. The compound of claim 3, which is 6-dimethylamino-1,3-di-(4-fluorophenyl)-5-methyl-hexahydro-s-triazine-2,4-dione.

10. The compound of claim 3, which is 6-dimethylamino-1,3-di-(4-bromophenyl)-5-methyl-hexahydro-s-triazine-2,4-dione.

11. The compound of claim 3, which is 6-dimethylamino-1,3-di-(3-chlorophenyl)-5-methyl-hexahydro-s-triazine-2,4-dione.

* * * * *